United States Patent [19]

Lucas et al.

[11] Patent Number: 4,619,533

[45] Date of Patent: Oct. 28, 1986

[54] TUYERE PYROMETER

[75] Inventors: John M. Lucas, Outremont; Frank Kitzinger, Montreal; Vladimir M. Labuc, Hudson; John G. Peacey, Lancaster; Albert Pelletier, Noranda; Gregory A. Wint, Pierrefonds, all of Canada

[73] Assignee: Noranda Inc., Toronto, Canada

[21] Appl. No.: 704,513

[22] Filed: Feb. 22, 1985

[30] Foreign Application Priority Data

Apr. 24, 1984 [CA] Canada ................................ 452678

[51] Int. Cl.⁴ ........................................ G01K 1/14
[52] U.S. Cl. .................................. 374/141; 374/125; 374/127; 374/128; 374/131; 374/132; 374/139; 266/269; 356/45; 250/352
[58] Field of Search ............... 374/129, 123, 149, 140, 374/125, 139, 141, 121, 126, 127, 128, 130, 132, 131; 110/182.5 T; 356/44, 45, 43; 250/352; 350/543, 544; 266/269

[56] References Cited

U.S. PATENT DOCUMENTS

| | | | |
|---|---|---|---|
| 866,312 | 9/1907 | Seidler | 266/269 |
| 2,261,559 | 11/1941 | Osborn | 266/269 |
| 2,448,199 | 8/1948 | Vollrath | 356/43 |
| 2,576,514 | 11/1951 | Bianco et al. | 374/125 |
| 2,814,953 | 12/1957 | Callaghan | 356/43 |
| 2,854,229 | 9/1958 | Earle | 266/269 |
| 3,379,062 | 4/1968 | Lellep | 374/125 |
| 3,570,277 | 3/1971 | Dorr et al. | 356/44 |
| 3,626,501 | 12/1971 | Baird et al. | 110/182.5 |
| 3,745,834 | 7/1973 | Velre et al. | 374/139 |
| 3,747,408 | 7/1973 | Stanworth et al. | 374/125 |
| 4,081,215 | 3/1978 | Penney et al. | 374/123 |
| 4,194,118 | 3/1980 | Kotaka et al. | 250/352 |
| 4,305,286 | 12/1981 | Beuth et al. | 374/141 |
| 4,306,835 | 12/1981 | Hurley | 356/43 |
| 4,326,798 | 4/1982 | Kahn | 374/127 |
| 4,435,093 | 3/1984 | Krause et al. | 374/129 |

FOREIGN PATENT DOCUMENTS 0778638 7/1957 United Kingdom ................ 374/125

OTHER PUBLICATIONS

"New Control Instruments for Bessemer Steelmaking", by P. Leroy, published on pp. 764–768, Journal of Metals, Jun. 1956.

Primary Examiner—Charles Frankfort
Assistant Examiner—Thomas B. Will
Attorney, Agent, or Firm—Fleit, Jacobson, Cohn & Price

[57] ABSTRACT

An apparatus for measuring bath temperature of metallurgical furnaces through a tuyere is disclosed. The apparatus comprises a periscope adapted to be inserted into a tuyere, a fiber optic cable having one end connected to the periscope for receiving radiation entering the tuyere from the bath of a furnace, and a two wavelength pyrometer connected to the other end of the fiber optic cable for analysing the radiations transmitted through the fiber optic cable to provide an indication of the temperature of the bath.

9 Claims, 7 Drawing Figures

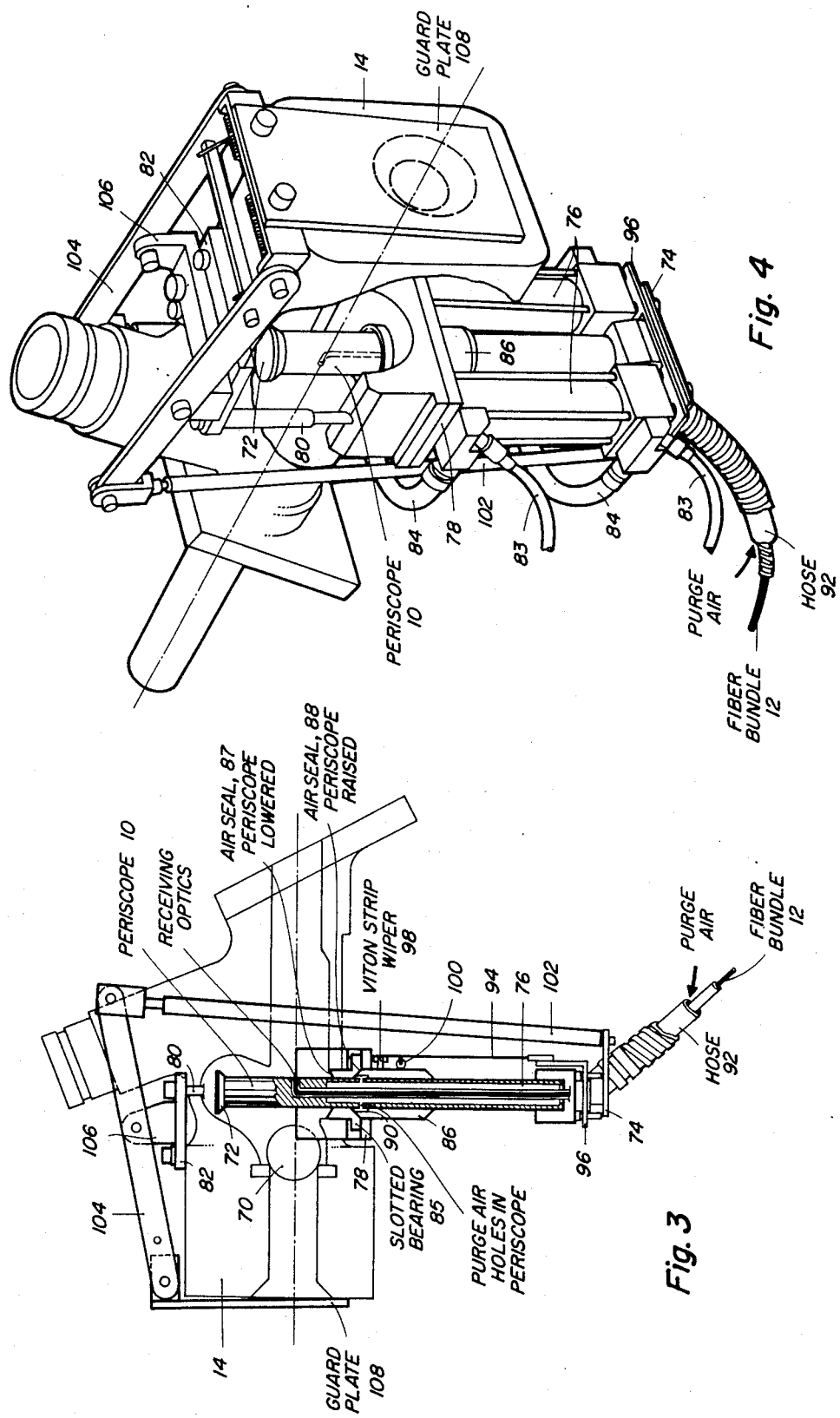

TUYERE PYROMETER

This invention relates to an apparatus for continuous measurement of the bath temperature of metallurgical furnaces, such as converters and reactors, through the tuyeres which are normally used for feeding air or reactants into the bath of the furnace.

Neither thermocouples, which rapidly dissolve, nor manually operated pyrometers are suitable for continuous measurement of the bath temperature of metallurgical furnaces. They may at most be used for periodic measurements. Continuous pyrometric measurement from above the bath surface is employed, but is known to give poor results because of emissivity variations, interference by gases and particulate matter in the intervening atmosphere, and dust accumulation on the optics. Continuous pyrometric measurements have also been done by the Institut de Recherches de la Siderurgie Francaise (IRSID) as reported by P. Leroy in a paper presented at the AIME, February 1956, New York. The apparatus developed by IRSID used a two-color pyrometer mounted on the bottom of a Bessemer converter and aimed at the metal bath through one of the tuyeres. However, the above pyrometer is mounted at the mouth of the tuyere and thus not suited for installation on a regular converter tuyere which needs to be regularly cleaned by a so-called tuyere puncher. Furthermore, the sensitive optical and electronic components of the pyrometer are located close to the converter and thus subjected to a hostile environment which reduces accuracy and reliability of the instrument. In addition, the IRSID pyrometer uses rotating disc filters to limit detection to selected operating wavelengths. The measurements are thus made at consecutive time intervals and this results in reduced measurement stability because of the large ($\pm 25\%$) and rapid radiation fluctuations with time to frequencies in excess of 100 Hz which are characteristic of converter tuyeres.

The apparatus in accordance with the present invention, comprises a periscope adapted to be inserted into a tuyere, a fiber optic cable having one end connected to the periscope for receiving radiation entering the tuyere from the bath of the furnace, and a two wavelength pyrometer connected to the other end of the fiber optic cable for analysing the radiation transmitted through the fiber optic cable to provide an indication of the temperature of the bath of the furnace.

The periscope is preferably attached to the piston of a pneumatic or hydraulic cylinder or to an electromagnetic actuator for insertion or withdrawal from the tuyere. A guard plate mechanism is connected to the piston of the cylinder and operated by the cylinder when the periscope is inserted inside the tuyere to prevent accidental puncher entry into the tuyere. A wiper assembly is also operated by the cylinder to rub the receiving end of the fiber optic cable when the periscope is operated so as to keep the receiving end of the cable or an attached window cleaned.

A seal is preferably mounted on the periscope to prevent loss of tuyere air in the operated and released position of the periscope. Means are also provided for air purging the periscope to deflect debris from the exposed part of the periscope. Air purging also cools the end of the fiber optic cable and generally maintains the entire fiber optic cable at a set temperature.

The two wavelength pyrometer comprises two radiation detectors, a beam splitter for directing the radiation towards the detectors, separate filters located between the beam splitter and each of the detectors for limiting detection to two selected operating wavelengths, and a divider connected to the output of the detectors for providing an output equal to the ratio of the intensities of the radiations at the two selected wavelengths. The output of the divider is fed to a scaling circuit for providing an output proportional to the bath temperature. A compensator circuit responsive to the temperature of the fiber optic cable is also provided for compensating for ratio shift with temperature. The detectors are also preferably mounted on a heat conductive metal block which is temperature stabilized.

The invention will now be disclosed, by way of example, with reference to the drawings in which:

FIGS. 3 and 4 show an embodiment of the mechanical operating system of the periscope;

Figure 1:
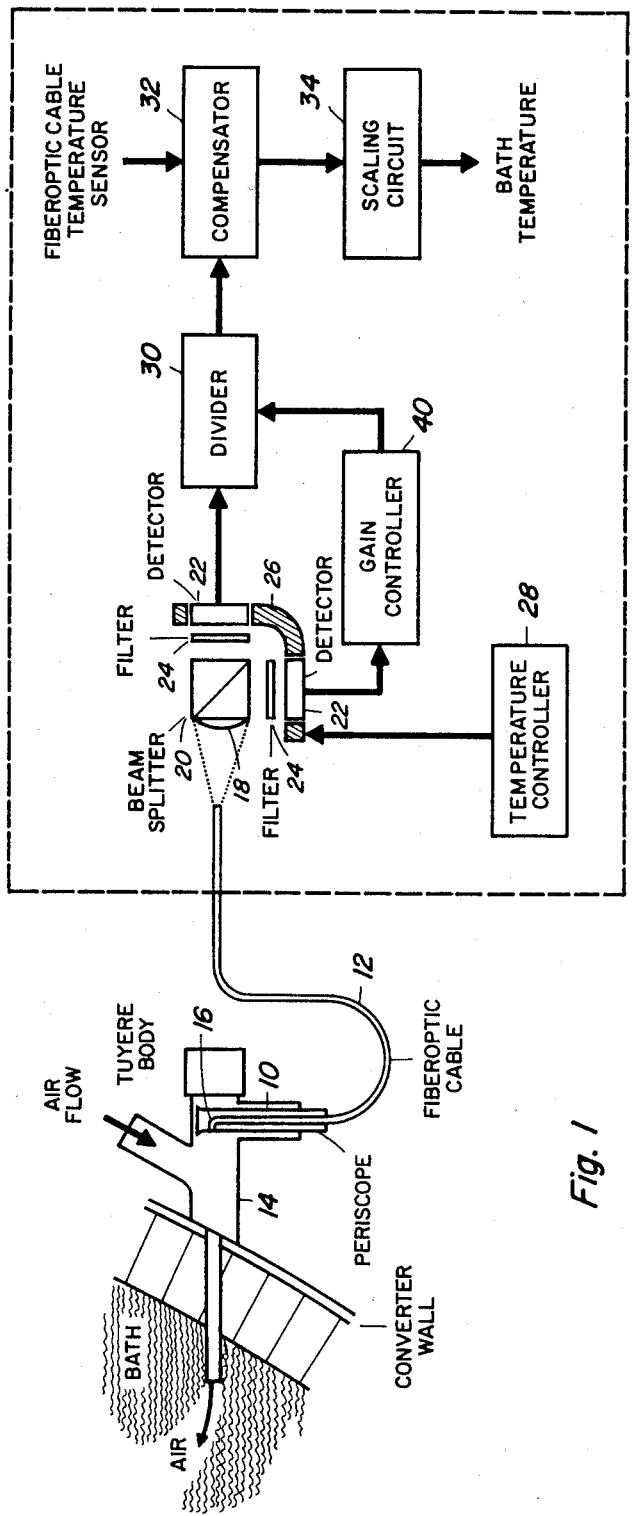
FIG. 1 is a schematic diagram of a two wavelength fiber optic tuyere pyrometer in accordance with the invention.

The system shown schematically in FIG. 1 comprises a periscope 10 which is used for inserting the end of a fiber optic cable 12 into a tuyere body 14 for measurement of the temperature of the bath of a metallurgical furnace upon which the tuyere is installed. As it will be seen later, the telescope is automatically withdrawn from the tuyere body during puncher operation. When the periscope is inserted into the tuyere body, the receiving end 16 of the fiber optic cable which is located on the side of the periscope facing the bath is directed toward the bath through the tuyere. The receiving end of the cable is thus directly illuminated by radiation from the exposed bath at the tuyere end. Although no optical elements are used at the fiber optic receiving end in the present embodiment, it is to be understood that windows, lenses, prisms or other elements may be used to provide alternative receiving end configurations. The radiation emerging from the opposite end of the fiber optic cable is, after passing through a focussing lens 18, partitioned by a cube beam splitter 20 between two silicon photodetectors 22. Bandpass interference filters 24 are located in front of the photodetectors to limit detection to selected operating wavelengths (0.8 and 0.95 microns). The choice of wavelengths was guided by a number of considerations, such as scale linearity, available radiant energy, absence of major atmospheric absorption ($H_2O$ and $CO_2$), and optical detector performance. Wavelengths other than the above may also be used. Each photodetector provides an output voltage proportional to the intensity of the radiation passing through it.

It was found that detector sensitivity at the two measurement wavelengths was both different and disproportionately variable with detector temperature. Consequently, in the absence of compensation, an increase in the temperature of the detectors resulted in an apparent decrease in meausred temperature. To overcome this problem and to maintain pyrometer accuracy over a wide range of ambient temperature, the detectors 22 were therefore inserted in a metal block 26 which was temperature stabilized by means of a temperature control circuit 28 (to be disclosed later) to heat the detectors or cool them as required.

The output voltages of the two detectors 22 is fed to a conventional voltage divider 30 which provides an output equal to the ratio of the intensities of the radiation sensed by the detectors at the two selected wavelengths. The output voltage of the divider 30 is fed through a fiber optic cable temperature compensator 32 to be disclosed later to a conventional scaling circuit 34 which provides a convenient relationship between measured bath temperature and divider output voltage.

The fiber optic cable comprises a fiber optic bundle fabricated from high quality optical glass, which nonetheless introduces considerable losses over the 15 meter transmission length required for positioning of the pyrometer alongside the converter. Since the fiber optic bundle contains several thousand fibers, the cost of high grade communication fibers would be prohibitive. However, as two wavelength pyrometry derives temperature from the ratio of intensities radiated at two specific wavelengths, accuracy is not diminished by constant losses affecting either or both wavelengths and less transmissive fibers such as standard optical glass fibers commonly used for light guides may be used. An example of such glass fibers is F2-EN1 sold by Fiberoptic Technology Inc. However, absorption losses or other effects which vary disproportionately with instrument temperature or other conditions at the two measurement wavelengths can cause substantial errors because of the small ratio shift with temperature (about 0.15% per °C. for the described system) and must be compensated. A gain controller 40 is located in either one of the detector output circuits. to compensate for disproportionate constant losses in the transformation of the incident radiation intensity at the two selected wavelengths into the detector output voltages. In addition, compensation dependent on the average temperature of the fiber optic bundle was applied using a resistance thermometer wire loop (to be disclosed later) thermally coupled to the full length of fiber optic cable to sense its average temperature. An output voltage proportional to the loop resistance was fed to the compensator circuit 32.

Figure 2:
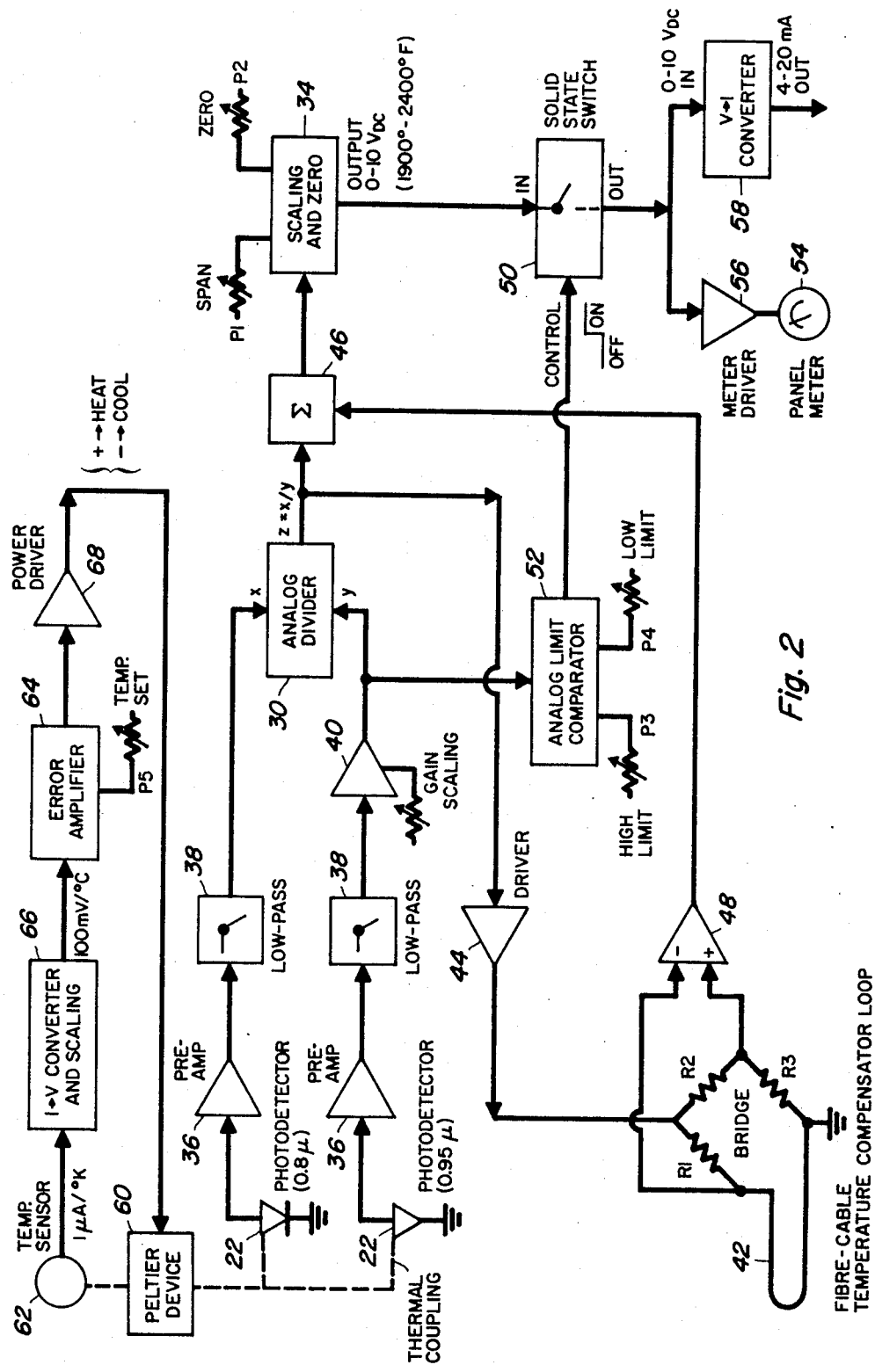
FIG. 2 is a block diagram of the electronic circuit of the two wavelength pyrometer.

Referring to FIG. 2 which shows a block diagram of the electronic circuitry associated with the two-colour pyrometer, a preamplifier 36 is connected to the output of each photodetector 22 and the output of each preamplifier is fed to a low pass filter 38 to filter out the high frequency noise signal picked up by the photodetectors. The output of the low-pass filters is fed to the analog divider 30 which provides an output $Z=x/y$, wherein x is the output of the $\lambda=0.8$ micron photodetector whereas y is the output of the $\lambda=0.95$ micron photodetector. A variable gain amplifier 40 is provided in the circuit of the $\lambda=0.95$ micron photodetector for scaling purposes although it could also be located in the circuit of the $\lambda=0.8$ micron photodetector. The temperature compensator circuit comprises a bridge circuit including three resistors R1, R2 and R3 and a resistance thermometer wire loop 42 which extends along the fiberoptic cable for sensing the average temperature thereof. The bridge is driven from the output of the divider 30 through a power amplifier 44. The output of the bridge is fed to a summing circuit 46 through an operational amplifier 48. The summing circuit 46 thus provides an output which is the sum of the outputs of the divider 30 and the compensator circuit 32. This output is fed to a conventional scaling circuit 34 which, by means of conventional potentiometers P1 and P2 performs scaling and zero setting functions so as to provide a 0–10 $V_{dc}$ output corresponding to a temperature range of 1900°–2400° F. This output is applied to a conventional solid state switch 50 which is controlled by a conventional analog limit comparator 52. The comparator closes solid state switch 50 when the output of amplifier 40 is within predetermined high and low limits as set by potentiometers P3 and P4. The output of the solid state switch 50 may be fed to a panel meter 54 through a driver amplifier 56 and/or a recorder (not shown) through a 0-10 $V_{dc}$ to 4-40 mA converter 58.

The temperature control circuit 28 (FIG. 1) is a conventional Peltier device 60 which is provided with a temperature sensor 62 responsive to the temperature of the photodetectors 22. The output of the temperature sensor is fed to an error amplifier 64 through a conventional current to voltage converter and scaling circuit 66. The error amplifier 64 compares the output of the temperature sensor against a predetermined temperature setpoint determined by a potentiometer P5 and drives a power amplifier 68 accordingly so as to heat or cool the Peltier device 60 to maintain maintain both photodetectors at the temperature setpoint.

As shown in FIGS. 3 and 4, the periscope 10 is mounted on a tuyere body which is machined to permit its insertion behind the conventional tuyere sealing ball 70. The periscope is a long hollow tube closed at the top by a cap 72 and the lower end of which is secured to the centre of a plate 74 which is attached, at each end to the piston of two adjacent pneumatic cylinders 76. The pneumatic cylinders are secured to a block 78 which is itself machined to fit the tuyere body and is secured thereto by means of bolts 80 extending from a plate 82 secured to the top of the tuyere body. The pneumatic cylinders are operated by air hoses 83 and are provided with bridging hoses 84 for simultaneous operation of the two pistons. A cylindrical bearing 85 is mounted in the center of the block for allowing up and down sliding movement of the periscope 10 betwen its end cap 72 and a bushing 86 which is secured to the periscope tube at a distance from the cap 72 which determines the extent of movement of the periscope into the tuyere body. This bearing is provided with upper and lower seats 87 and 88 which cooperate with corresponding seats on cap 72 and bushing 86 to form seals to prevent loss of tuyere air. Provision is also made for air purge of the seals through a circular slot 90 in the upper end of bushing 86 and longitudinal slots (not shown) in the periscope bearing 85. This air enters the hollow tube of the periscope through a hose 92 surrounding the fiber optic cable 12 and serves to deflect debris from the exposed part of the periscope and its bearing and to cool the receiving end 16 of the fiber optic cable and the entire fiber optic cable generally. The fiber optic cable passes through the center of the hollow tube of the periscope and is bent at 90° in the receiving end 16 which protrudes through a hole in the tube facing the tuyere bore.

A wiper assembly 94 is mounted on a bracket 96 attached to the lower end of the cylinders and is provided with a strip 98 of Viton rubber or any other suitable material to rub on the receiving end 16 of the cable so as to clean the receiving end each time the periscope is operated and so avoid loss of measurement due to excessive dust accumulation on the receiving end. This eliminates the need for manual cleaning. The rubbing pressure of the strip 98 is removed when roller 100 engages the bushing 86.

A rod 102 is attached at its lower end to each end of plate 74 and its upper end to a linkage 104 which is pivoted on a bracket 106 mounted on the plate 82. The other end of each linkage 104 is attached to a spring loaded guard plate 108 which covers the tuyere end to prevent accidental puncher entry in the event of failure of the pneumatic control system (not shown) which automatically lowers the periscope when a puncher is at or near the tuyere where the periscope is installed. The periscope is also automatically lowered to protect the receiving end of the fiber optic cable from possible flame entry on converter roll.

Figure 5:
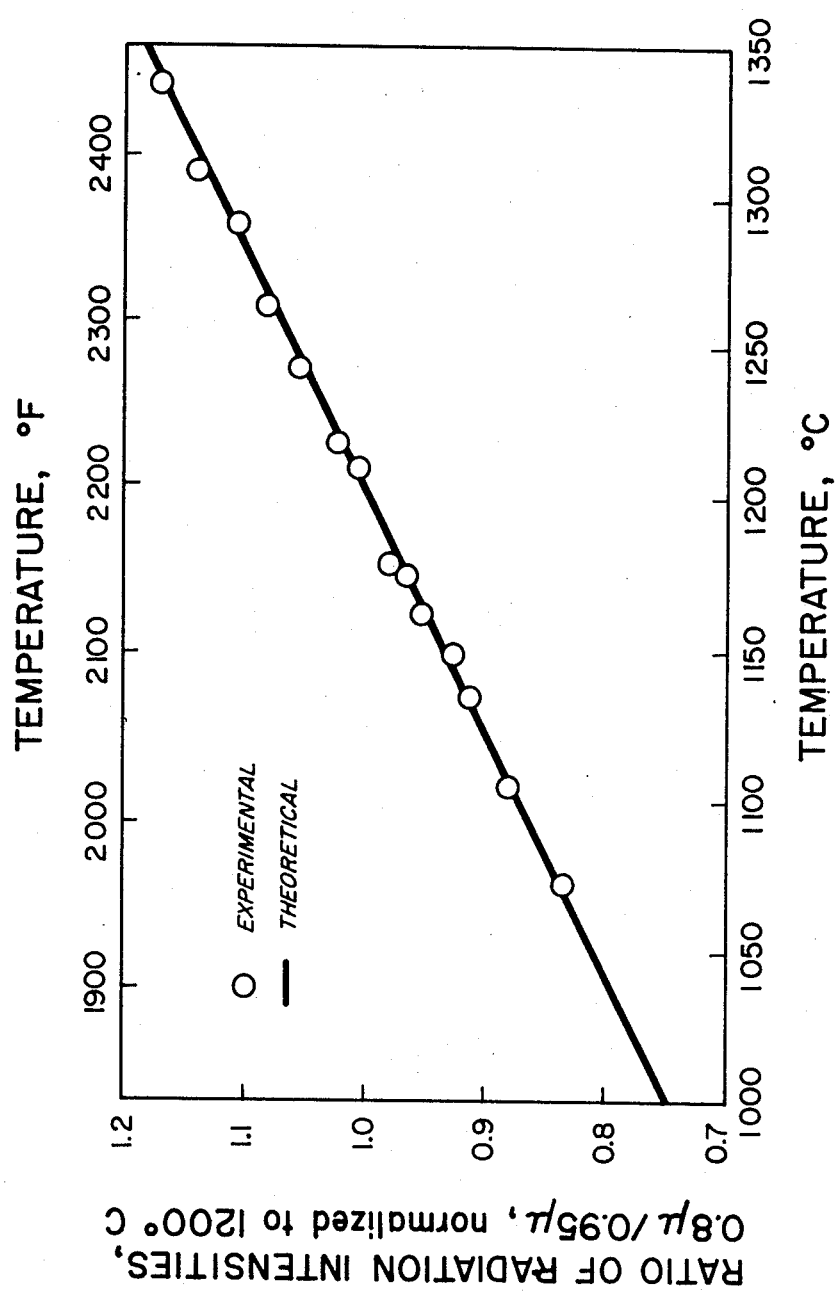
FIG. 5 illustrates the laboratory calibration of the tuyere pyrometer against a conventional optical pyrometer.
Figure 6:
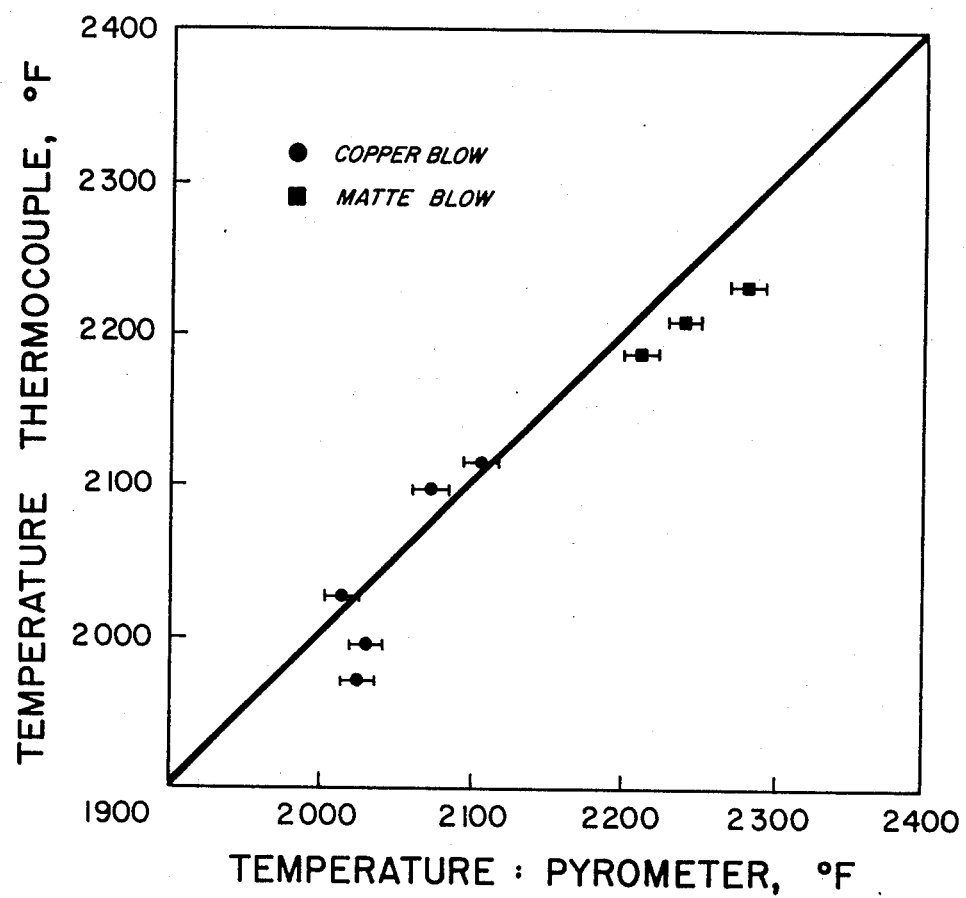
FIG. 6 illustrates direct calibration, using thermocouples, against bath temperature for the pyrometer in accordance with the present invention.

FIG. 5 of the drawings is a graph obtained from a laboratory calibration of the pyrometer in accordance with the invention against a Leeds and Northrup optical pyrometer using a Philips 911 tungsten strip lamp as a source. It is seen that the pyrometer reading corresponds to the theoretical thermal emissivity at the same temperature (black line). Results of direct calibration, using S type thermocouples, against bath temperature for a pyrometer in accordance with the invention installed on a copper converter are presented in FIG. 6. This graph is corrected for a 80° C. offset due to the spectral emissivity of the tungsten calibration source. The emissivity of tungsten declines about 10% between the 0.8 and 0.95 micron measurement wavelengths, while the converter bath was found to exhibit equal emissivity at the above two wavelengths.

Figure 7:
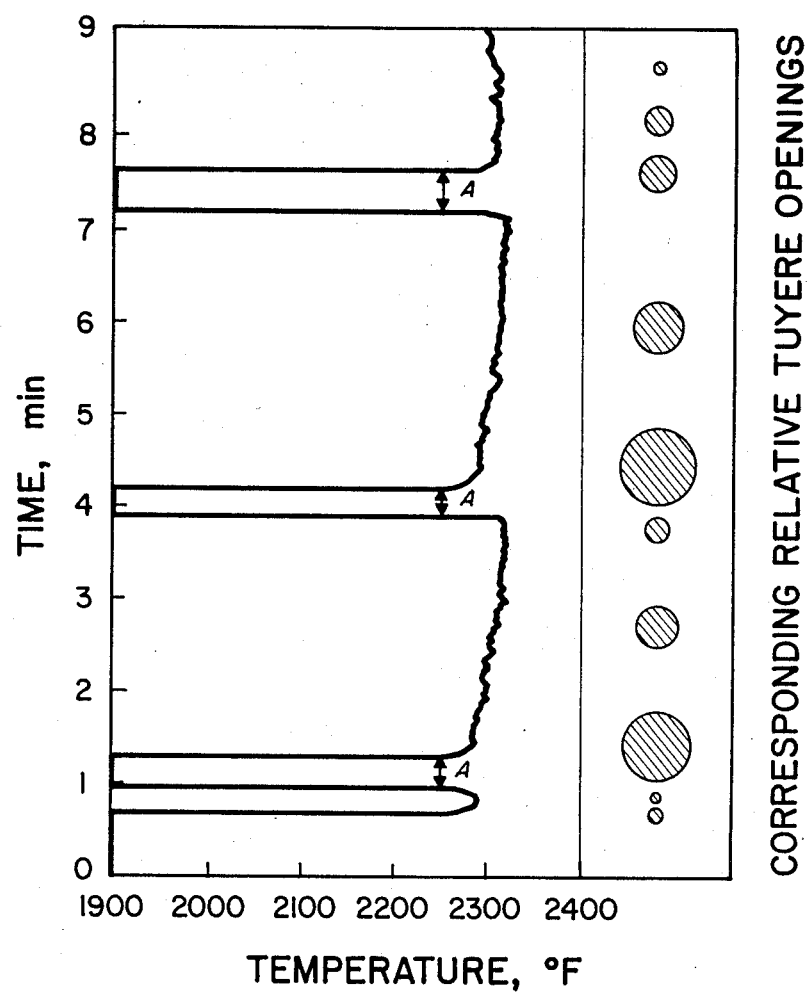
FIG. 7 illustrates pyrometer output during matte blow showing measurement unaffected by severe tuyere blocking.

The pyrometer's independence of tuyere blocking is illustrated in FIG. 7 which shows pyrometer output during matte blow of a converter. The arrows A indicate tuyere punching time intervals. Even severe blocking, indicated by the size of the circles (derived from the measured intensity of the detected radiation) did not significantly offset the temperature measurement.

It was also found that tuyere burn back did not significantly effect the temperature measurement.

Although the invention has been disclosed with reference to a preferred embodiment, it is to be understood that it is not limited to such embodiment and that other alternatives are also envisaged within the scope of the following claims.

We claim:

1. An apparatus for measuring bath temperature of a metallurgical furnace through a tuyere which is used to blow air into the metallurgical furnace and needs to be regularly cleaned by a tuyere puncher, said apparatus comprising:
    (a) a movable periscope adapted to be inserted into said tuyere at an angle to the longitudinal axis of the tuyere, and fully retracted therefrom;
    (b) a fiber optic cable having one end mounted in said periscope for receiving radiation entering the tuyere from the bath of the furnace;
    (c) an actuator for moving said periscope to an operating position within said tuyere to detect radiation being emitted from the bath and for moving said periscope to a fully retracted position from the tuyere to allow entry of the puncher into the tuyere to clean the tuyere; and
    (d) a two wavelength pyrometer connected to the other end of said fiber optic cable for analysing the radiation transmitted through the fiber optic cable to provide an indication of the temperature of the bath.

2. An apparatus as defined in claim 1, wherein said actuator is a pneumatic or hydraulic cylinder or an electromagnetic actuator.

3. An apparatus as defined in claim 1, further comprising a guard plate connected to the actuator and operated by the actuator when the periscope is inserted inside the tuyere to prevent accidental puncher entry into the tuyere.

4. An apparatus as defined in claim 1, further comprising a bearing mounted on said tuyere for allowing sliding movement of the periscope into and out of the tuyere and air seals formed between the periscope and the bearing to prevent loss of tuyere air in the operated and released positions of the periscope.

5. An apparatus as defined in claim 4, further comprising means for air purging the periscope to deflect debris from the airseals of the periscope and to cool said one end of the fiber optic cable and generally maintain the entire fiber optic cable at a set temperature.

6. An apparatus as defined in claim 1, further comprising a wiper assembly connected to the actuator and operated by said actuator to rub said one end of the fiber optic cable when the periscope is operated.

7. An apparatus as defined in claim 1, wherein said two wavelength pyrometer comprises two radiation detectors, a beam splitter for directing the radiations to the detectors, separate filters located between the beam splitter and each of the detectors for limiting detection to two selected operating wavelengths, and a divider connected to the output of said detectors for providing an output equal to the ratio of the intensities of the radiations at the two selected wavelengths.

8. An apparatus as defined in claim 7, further comprising a calibration circuit responsive to said divider for providing an output proportional to the bath temperature and a compensation circuit responsive to the temperature of said fiber optic cable for compensating for ratio shift with temperature.

9. An apparatus as defined in claim 7, wherein the detectors are mounted in a metal block and further comprising means for stabilizing the temperature of said metal block.

* * * * *